(12) United States Patent
Suneya et al.

(10) Patent No.: US 8,684,120 B2
(45) Date of Patent: Apr. 1, 2014

(54) CAB FOR CONSTRUCTION MACHINE

(75) Inventors: Junichi Suneya, Komatsu (JP); Shigeaki Usui, Komatsu (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/514,544

(22) PCT Filed: Dec. 22, 2011

(86) PCT No.: PCT/JP2011/079859
§ 371 (c)(1),
(2), (4) Date: Jun. 7, 2012

(87) PCT Pub. No.: WO2012/086773
PCT Pub. Date: Jun. 28, 2012

(65) Prior Publication Data
US 2012/0234617 A1 Sep. 20, 2012

(30) Foreign Application Priority Data
Dec. 24, 2010 (JP) .................. 2010-287896

(51) Int. Cl.
*B62D 25/14* (2006.01)
*B62D 33/06* (2006.01)
*E02F 9/16* (2006.01)
*B60K 37/00* (2006.01)

(52) U.S. Cl.
CPC ......... *B62D 25/145* (2013.01); *B60K 2350/943* (2013.01)

USPC ..... 180/89.12; 180/90; 280/779; 296/190.08; 296/72

(58) Field of Classification Search
CPC .. B62D 25/145; B62D 25/14; B62D 33/0617; B60K 37/00; B60K 2350/943
USPC ............... 180/89.12, 90, 311, 89.1, 78, 900; 280/779; 296/190.08, 190.01, 72, 70; D15/33
See application file for complete search history.

(56) References Cited

U.S. PATENT DOCUMENTS 4,126,202 A * 11/1978 Hern ...................... 180/89.12
4,372,410 A * 2/1983 Loken et al. .......... 180/89.12
4,682,788 A * 7/1987 Yoshimura ............... 280/779

FOREIGN PATENT DOCUMENTS

| JP | 2001-26947 A | | 1/2001 | |
|---|---|---|---|---|
| JP | 2002-59761 A | | 2/2002 | |
| JP | 2007154444 A | * | 6/2007 | |
| WO | WO 2007/063668 A1 | * | 7/2007 | ........ E02F 9/16 |

* cited by examiner

Primary Examiner — Keith Frisby
(74) Attorney, Agent, or Firm — Global IP Counselors, LLP

(57) ABSTRACT

In a cab for construction machine, a support structure for a front console is provided with a first fixed member supporting a cover member and a second fixed member supporting the first fixed member from below the first fixed member. The first fixed member is fixed to a front plate at two locations directly below both ends of a front window. The second fixed member is fixed to a floor plate.

13 Claims, 7 Drawing Sheets

CAB FOR CONSTRUCTION MACHINE

CROSS-REFERENCE TO RELATED APPLICATIONS

This application claims priority to Japanese Patent Application No. 2010-287896 filed on Dec. 24, 2010, the disclosure of which is hereby incorporated herein by reference in its entirety.

TECHNICAL FIELD

The present invention relates to a cab for a construction machine, the cab being provided with a support structure for a front console.

BACKGROUND ART

In conventional construction machine such as a wheel loader, a front console is disposed to the front of the steering wheel for manual operation by an operator. Electronic components, such as a monitor, various switches, and the like, are mounted into the front console.

A method of splitting a front console into a center console, a right console, and a left console, with the object of being able to mount more components, is known in the prior art (for example, Japanese Laid-open Patent Application 2001-26947). Several electronic components, harnesses, and the like are mounted into the consoles.

SUMMARY

However, as the size and shape of the cab differs depending on the type and model of construction machine, according to the method disclosed in Patent Document 1, it is necessary to prepare a front console appropriate to the size and shape of the cab, for each type and model of construction machine.

Specifically, when a cab of a small size, the right console and the left console may interfere with the interior walls, therefore making it necessary to redesign the consoles to smaller size. Moreover, when a cab is of a large size, the inner walls lie exposed to the right side of the right console and the left side of the left console, making it necessary to redesign the consoles to larger size. Accordingly, it is to be desired to improve the versatility of a front console, so that it can be used in common among different types and models of construction machine.

With the foregoing in view, it is an object of the present invention to afford a cab for a construction machine, provided with a support structure for a front console able to improve the versatility of the front console.

The cab for a construction machine according to a first aspect of the present invention is provided with a front console, a support structure for the front console, a right garnish disposed to the right side of the front console, and a left garnish disposed to the left side of the front console. The front console has a floor plate, a front plate rising from a front end of the floor plate, a front window rising up from the front plate, a cover member, a plurality of electronic components mounted into the cover member, and a harness connected to the plurality of electronic components. The support structure for the front console has a first fixed member for supporting the cover member to the inside of the cover member, the first fixed member fixed to the front plate at two locations directly below both ends of the front window, and a second fixed member for supporting the first fixed member from below the first fixed member, the second fixed member fixed to the floor plate.

According to the cab for a construction machine of the first aspect of the present invention, fine adjustments to the size and/or shape of the front console unit as a whole can be made through modification of the size and/or shape of the right garnish and the left garnish, thereby obviating the need to modify the size and/or shape of the front console for cabs of different size and/or shape. Additionally, due to the support structure of the front console mentioned previously, all of the electronic components can be disposed in a centralized fashion in the front console. Consequently, the versatility of the front console can be improved.

The cab for a construction machine according to a second aspect of the present invention is one according to the first aspect, wherein the first fixed member has a pipe including a first end and a second end that are connected to the front plate; and the harness is wired along the pipe.

According to the cab for a construction machine of the second aspect of the present invention, the harness can be readily arranged, and therefore the harness can be wired easily. Additionally, because both ends of the pipe are connected to the front plate, the front console can be securely fixed.

The cab for a construction machine according to a third aspect of the present invention is one according to the third aspect, provided with a steering unit having a steering wheel, and a steering shaft supporting the steering wheel; wherein the support structure for the front console supports the steering wheel shaft.

According to the cab for a construction machine of the third aspect of the present invention, the steering shaft is supported by the support structure for the front console, which is fixed not only to the floor plate but to the front plate as well. Therefore, the steering shaft can be supported firmly, whereby vibration of the steering shaft and the steering wheel can be suppressed.

The cab for a construction machine according to a fourth aspect of the present invention is one according to the first aspect, wherein the height of the right garnish decreases as the distance from the front console increases.

According to the cab for a construction machine of the fourth aspect of the present invention, the operator is readily afforded a wide field of view ahead to the right, while seated in the operator's seat disposed in the center of the cab.

The cab for a construction machine according to a fifth aspect of the present invention is one according to the first aspect, wherein the height of the left garnish decreases as the distance from the front console increases.

According to the cab for a construction machine of the fifth aspect of the present invention, the operator is readily afforded a wide field of view ahead to the left, while seated in the operator's seat disposed in the center of the cab.

The cab for a construction machine according to a sixth aspect of the present invention is one according to the second aspect, wherein both ends of the pipe are bent downward from a center part of the pipe.

According to the cab for a construction machine of the sixth aspect of the present invention, because both ends of the pipe can be disposed at lower positions, the operator is readily afforded a wide field of view ahead to the left and right. In particular, it is possible to widen the field of view through downward extension of both the left and right bottom ends of the front window.

According to the present invention, there can be afforded a cab for a construction machine, provided with a support structure for a front console able to improve the versatility of the front console.

DETAILED DESCRIPTION OF THE EMBODIMENTS

Figure 1:
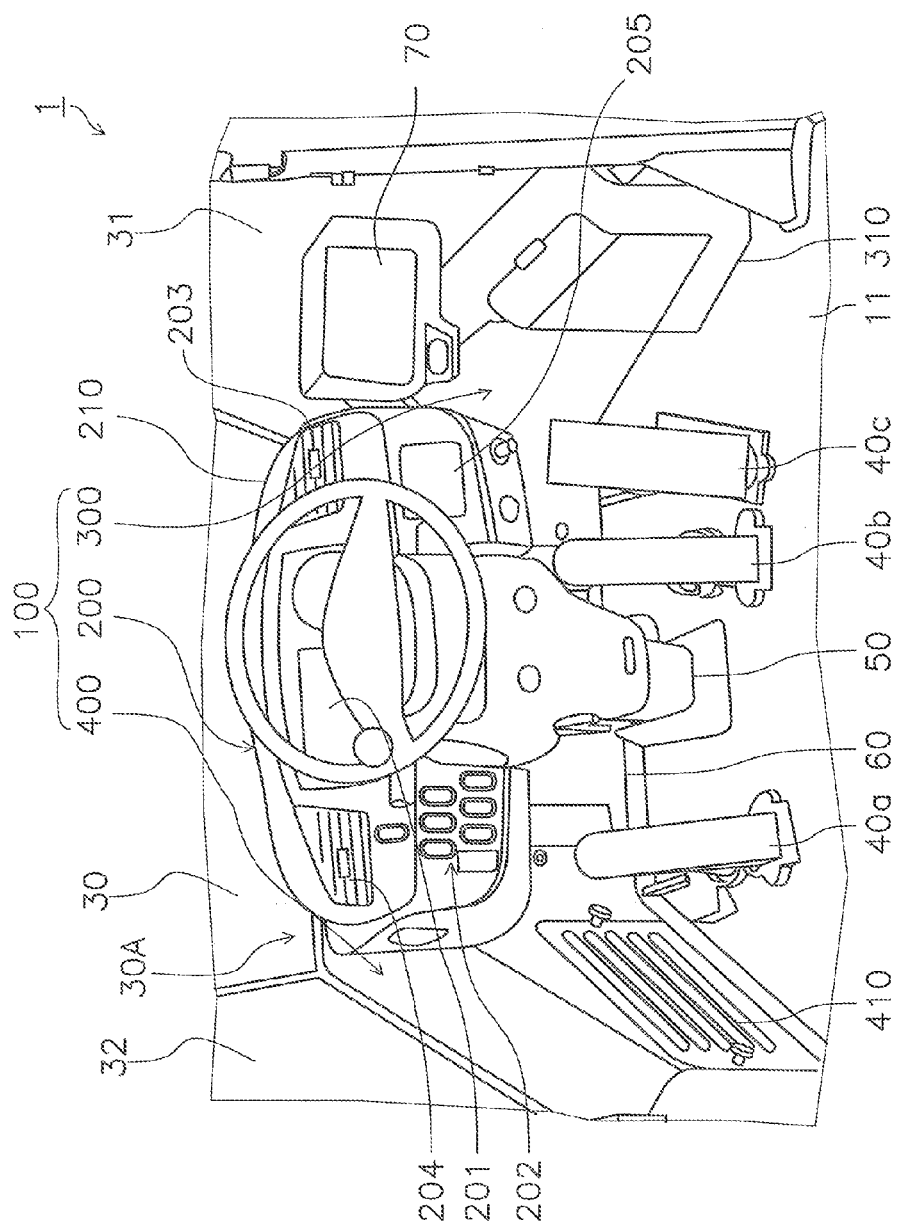
FIG. 1 is a perspective view showing the configuration of a cab 1 according to an embodiment.

Next, an embodiment of the present invention will be described with reference to the drawings. In the following drawings, sections that are the same or similar have been assigned the same or similar reference numerals. The drawings are schematic, and in some cases the dimensional ratios and other information may differ from the actual ones. Consequently, the specific dimensions and the like should be decided upon in consideration of the following description. It is to be understood that sections of mutually different dimensional relationships and/or ratios may be included across different drawings.

Configuration of Cab 1

Figure 2:
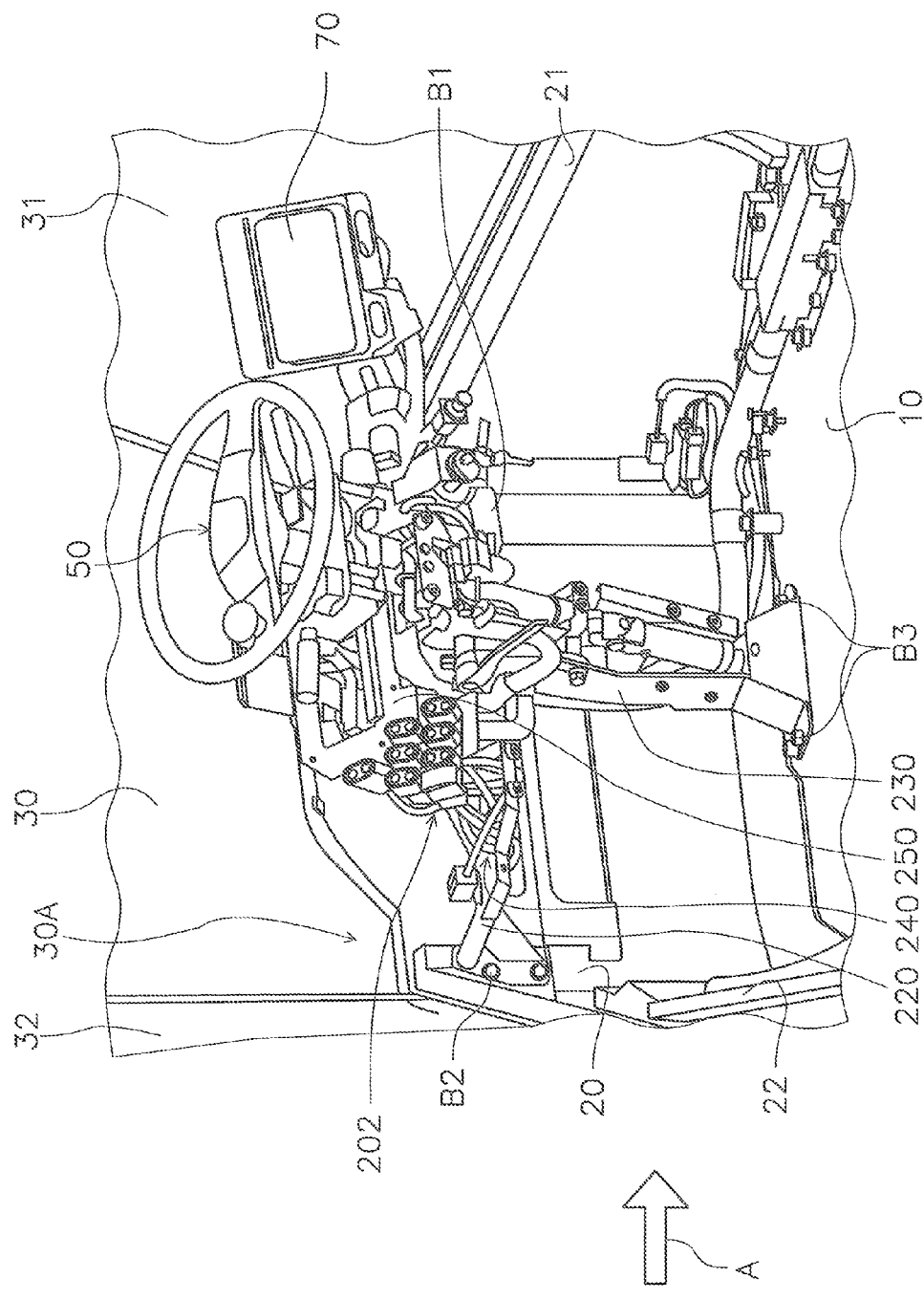
FIG. 2 is a perspective view showing the configuration of the cab 1 with the exterior trim removed.
Figure 3:
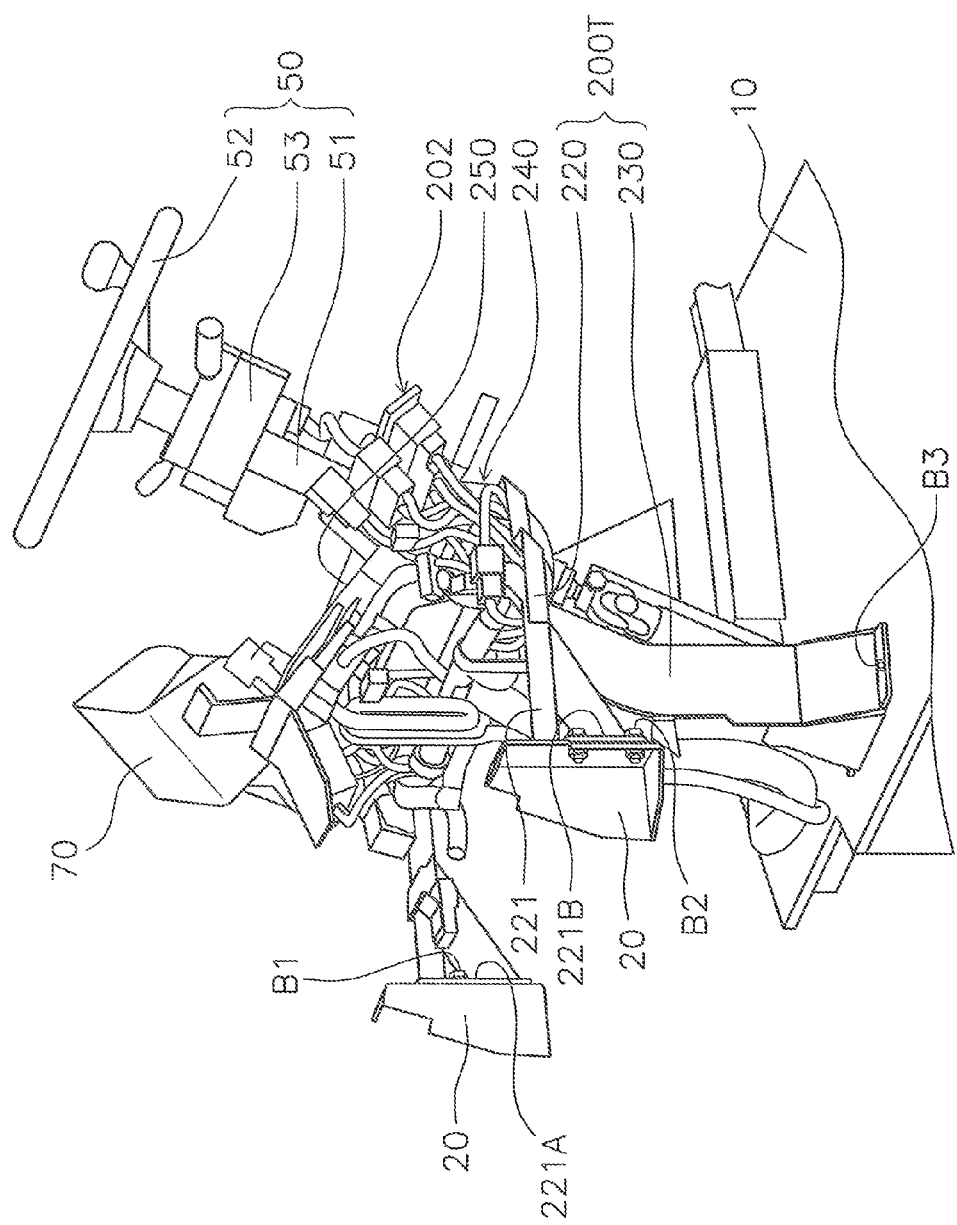
FIG. 3 is an arrow view taken from the direction of arrow A of FIG. 2.

The configuration of a cab 1 according to the embodiment will be described with reference to the drawings. FIG. 1 is a perspective view showing the configuration of the cab 1 according to the embodiment. FIG. 2 is a perspective view showing the configuration of the cab 1 with the exterior trim removed. FIG. 3 is an arrow view taken from the direction of arrow A of FIG. 2.

The cab 1 is outfitted to a construction machine, such as a wheel loader, a loading shovel, or the like. The cab 1 is provided with a floor plate 10, a front plate 20, a front right plate 21, a front left plate 22, a front window 30, a front right window 31, a front left window 32, multiple pedals 40, a steering unit 50, a decorative plate 60, a rear direction monitor 70, and a front console unit 100. The front console unit 100 is constituted by a front console 200, a front console support structure 200T, a right garnish 300, and a left garnish 400.

The floor plate 10 is a member of plate shape disposed on a frame, not shown. As shown in FIG. 1, a floor panel 11 rests on the floor plate 10.

The front plate 20 is a member of plate shape that is provided to stand on the front end of the floor plate 10. In the present embodiment, as shown in FIG. 2, the front plate 20 is formed to project towards the front of the vehicle, and is constituted by a combination of a plurality of plate members and a plurality of post members.

The front right plate 21 is disposed to the right side of the front plate 20. The front right plate 21 extends diagonally rightward and rearward from the right end of the front plate 20. The front right plate 21 is disposed to the front right side of an operator's seat, not shown.

The front left plate 22 is disposed to the left side of the front plate 20. The front left plate 22 extends diagonally leftward and rearward from the left end of the front plate 20. The front left plate 21 is disposed to the front left side of an operator's seat.

The front window 30 is provided to stand on the front plate 20. In the present embodiment, the front window 30 has a pair of downward-projecting parts 30A (only the downward-projecting part 30A on the left side is illustrated) that project downward at the two ends thereof in the widthwise direction of the vehicle. In so doing, the operator has a wider field of view to the left and right of the front console 200. The front right window 31 is provided to stand on the front right plate 21. The front left window 32 is provided to stand on the front left plate 22.

The multiple pedals 40 include a brake pedal 40a, a brake pedal 40b, and an accelerator pedal 40c. The multiple pedals 40 are disposed on the floor plate 10.

The steering unit 50 is disposed between the operator's seat, not shown, and the front console unit 100. The steering unit 50 is supported by the front console 200. The steering unit 50 has a steering shaft 51, a steering wheel 52, and a column 53. The steering shaft 51 is provided to stand to the floor plate 10. The steering shaft 51 is supported by the front console support structure 200T. The steering wheel 52 is mounted onto the top end of the steering shaft 51. The column 53 is disposed below the steering wheel 52, and encircles the steering shaft 51.

As shown in FIG. 1, the decorative plate 60 is fixed to the right garnish 300 and the left garnish 400. The decorative plate 60 covers the front plate 20 below the front console 200.

The rear direction monitor 70 displays an image taken rearward from the construction machine. The rear direction monitor 70 is fastened to the front console 200.

The front console unit 100 covers the entire surface of the front plate 20, below the front window 30. The impression of the cab 1 interior is improved thereby.

As shown in FIG. 1, the front console 200 has a cover member 210, a display monitor 201 (one example of an "electronic component"), a switch bank 202 (one example of an "electronic component"), a right louver 203, a left louver 204, and an A/C panel 205 (one example of an "electronic component"). In this way, all of the plurality of electronic components necessary for controlling driving of the construction machine are housed inside the front console 200. As shown in FIG. 2, the front console 200 also has a harness 240 and an electronic component fastening part 250.

The cover member 210 is a member for mounting all of the plurality of electronic components (the display monitor 201, the switch bank 202, and the A/C panel 205), and for covering the harness 240 connected to the plurality of electronic components.

The display monitor 201 is a multi-monitor capable of switching among a plurality of screens (a load meter display screen, a radiator fan rotation status display screen, etc.). The display monitor 201 is mounted in the center of the cover member 210. The switch bank 202 includes a plurality of switches for driving, which are necessary for driving the construction machine. The switch bank 202 will be discussed in detail below. The right louver 203 is mounted in the cover member 210, to the right side of the display monitor 201. The left louver 204 mounted in the cover member 210, to the left side of the display monitor 201. The right louver 203 and the left louver 204 are forced air vents for the air conditioning system. The A/C panel 205 is a multi-monitor for adjusting the air conditioning system, not illustrated, and can be touch-operated to perform temperature adjustment and/or mode switching. The A/C panel 205 is mounted in the cover member 210, below the right louver 203.

The harness 240 is connected to the switch bank 202. The harness 240 is wired along a pipe 221 of a first fixed member 220, as discussed later.

The electronic component fastening part 250 supports the display monitor 201, the switch bank 202, and the harness 240. The electronic component fastening part 250 is fastened to the front console support structure 200T.

The front console support structure 200T is a support structure for supporting the front console 200. The front console support structure 200T is constituted by the first fixed member 220 and a second fixed member 230 (see FIGS. 2 and 3).

Figure 4:
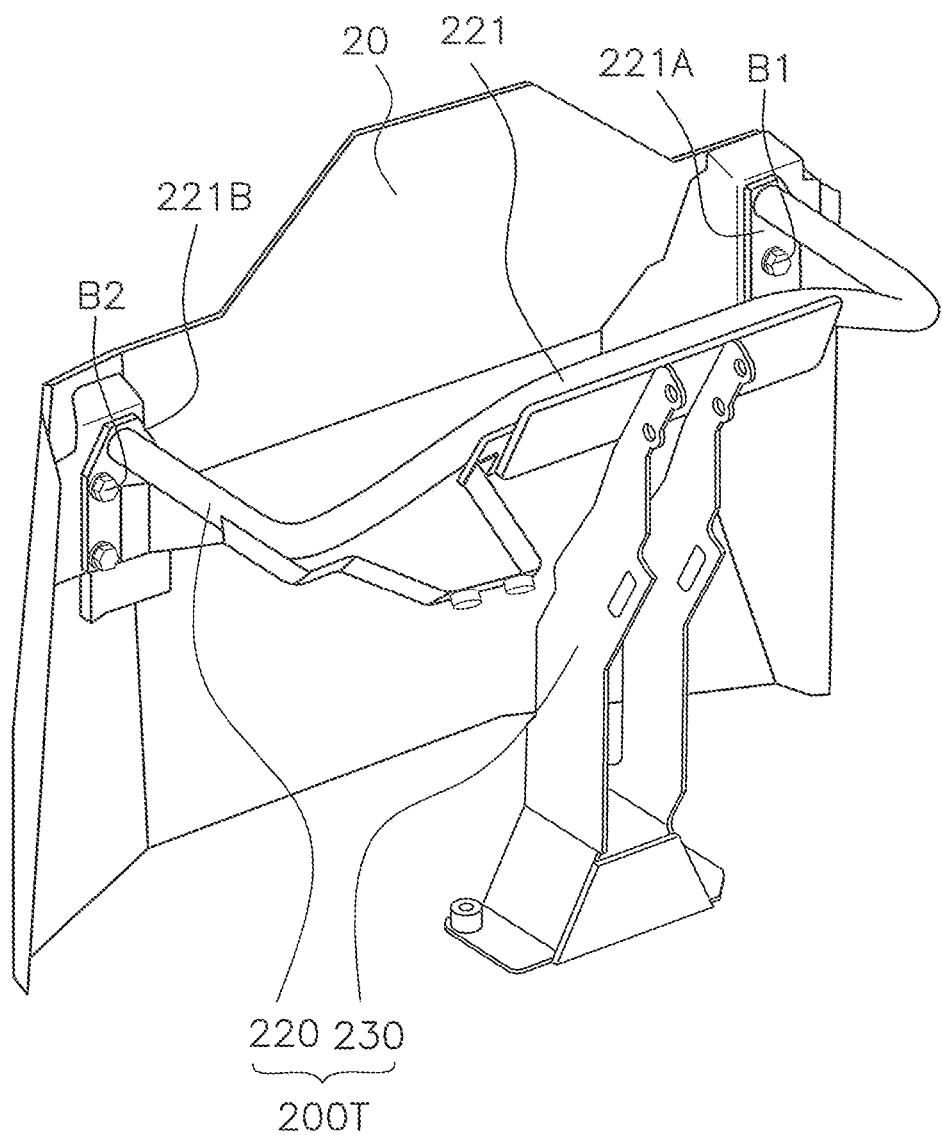
FIG. 4 is a perspective view showing the configuration of a front console support structure 200T according to the embodiment.

FIG. 4 herein is a perspective view showing the configuration of the front console support structure 200T. The first fixed member 220 is disposed inside the cover member 210 between the front plate 20 and the cover member 210, and supports the cover member 210. The first fixed member 220 has a pipe 221 that curves along the inside face of the cover member 210. Both ends of the pipe 221 are bent downward from the center part of the pipe, as well as extending towards the front. The pipe 221 is fixed to the front plate 20 at two locations directly below both ends of the front window 30. Specifically, the right end 221A of the pipe 221 is connected by a bolt B1 to the front plate 20, and the left end 221B of the pipe 221 is connected by a bolt B2 to the front plate 20. The second fixed member 230 is disposed below the first fixed member 220, and extends upward to support a center part of the pipe 221 from below. The bottom end of the second fixed member 230 is fixed by a bolt B3 to the floor plate 10. The respective configurations of the first fixed member 220 and the second fixed member 230 are discussed in more detail below.

As shown in FIG. 1, the right garnish 300 is disposed to the right side of the front console 200. The right garnish 300 has only storage 310, and houses no electric components. Specifically, the right garnish 300 is electrically isolated from the front console 200 and the control devices (not illustrated), and is furnished solely for ornamental purposes. In the present embodiment, the right garnish 300 is fixed to the front plate 20, and is not connected directly to the front console 200. The height of the right garnish 300 decreases as the distance from the front console 200 increases, and specifically, separation from the center in the widthwise direction of the vehicle. In so doing, the operator is afforded improved frontward visibility when seated in the operator's seat disposed in the center within the cab 1 in the widthwise direction of the vehicle.

As shown in FIG. 1, the left garnish 400 is disposed to the left side of the front console 200. The left garnish 400 has only an air intake 410 for the air conditioning system, and houses no electric components or harness. Specifically, the left garnish 400 is electrically isolated from the front console 200 and the control devices (not illustrated), and is furnished solely for ornamental purposes. In the present embodiment, the left garnish 400 is fixed to the front plate 20, and is not connected directly to the front console 200. The height of the left garnish 400 decreases as the distance from the front console increases 200, and specifically separation from the center in the widthwise direction of the vehicle. In so doing, the operator is afforded improved frontward visibility when seated in the operator's seat disposed in the center within the cab 1 in the widthwise direction of the vehicle.

Configuration of Switch Bank 202

Figure 5:
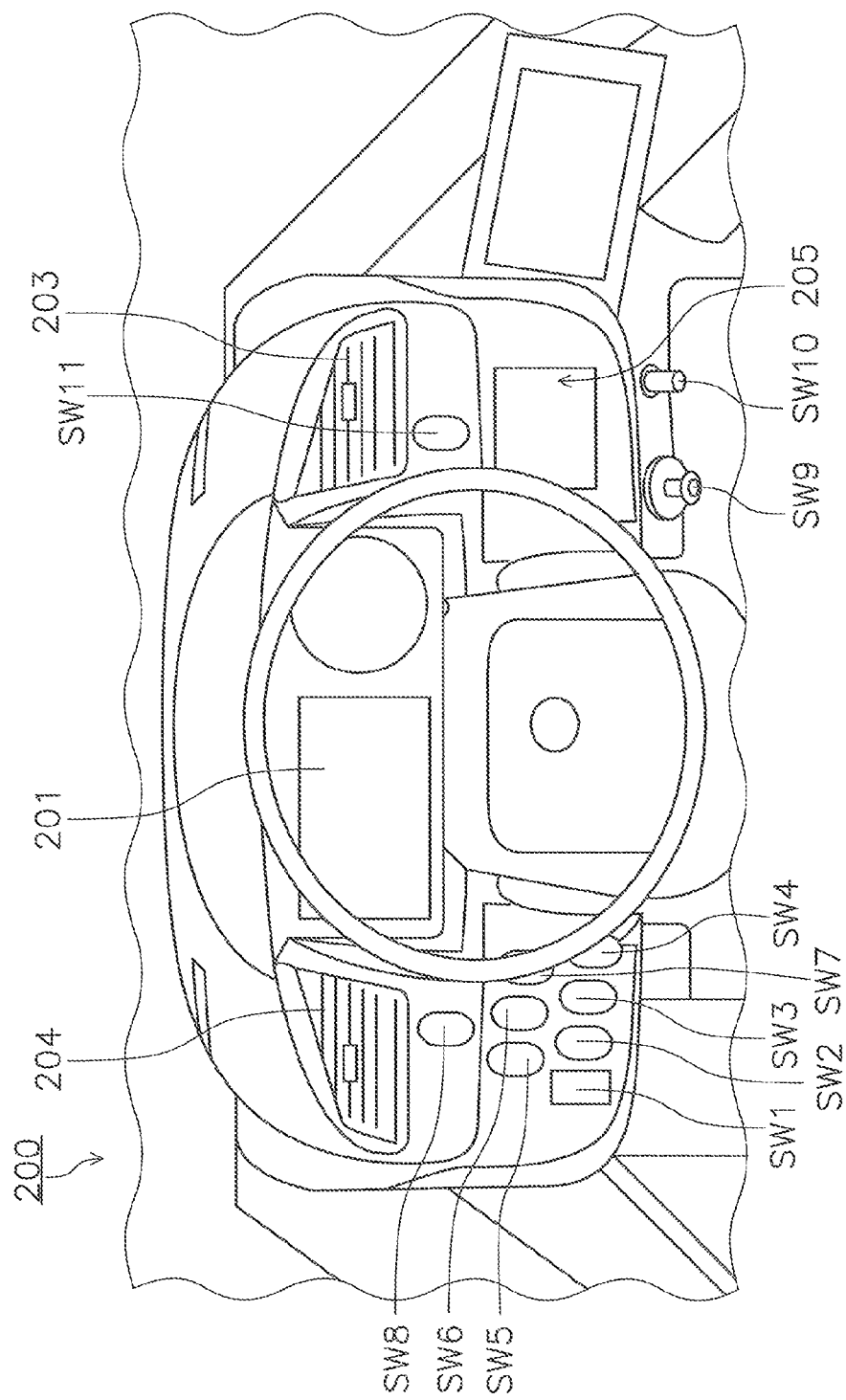
FIG. 5 is a front view of a front console 200 according to the embodiment.

The configuration of the switch bank 202 of the present embodiment will be described with reference to the drawings. FIG. 5 is a front view of the front console 200 according to the embodiment.

The switch bank 202 includes a plurality of switches for driving, which are necessary for driving the construction machine. In the present embodiment, all of the plurality of switches for driving are mounted in a centralized fashion in the front console 200, as shown in FIG. 5. Specifically, the plurality of switches for driving are not mounted in the right garnish 300 or the left garnish 400.

The switch bank 202 includes eleven switches SW: a front working lamp switch SW1, a rear working lamp switch SW2, a fog lamp switch SW3, a monitor backlight switch SW4, a T/M shift mode changeover switch SW5, a power mode changeover switch SW6, an ECSS (drive damper) switch SW7, a hazard switch SW8, a key switch SW9, a lighter switch SW10, and a parking switch SW11.

In the present embodiment, switches SW1 to SW8, which are the eight switches that are used with high frequency during driving on public roads or driving at high speed, are disposed together at the left side on the front face of the front console 200 (specifically, below the left louver 204), The key switch SW9 and the lighter switch SW10 are disposed below the A/C panel 205, and the parking switch SW11 is disposed between the left louver 203 and the A/C panel 205.

Configuration of Front Console Support Structure 200T

Figure 6:
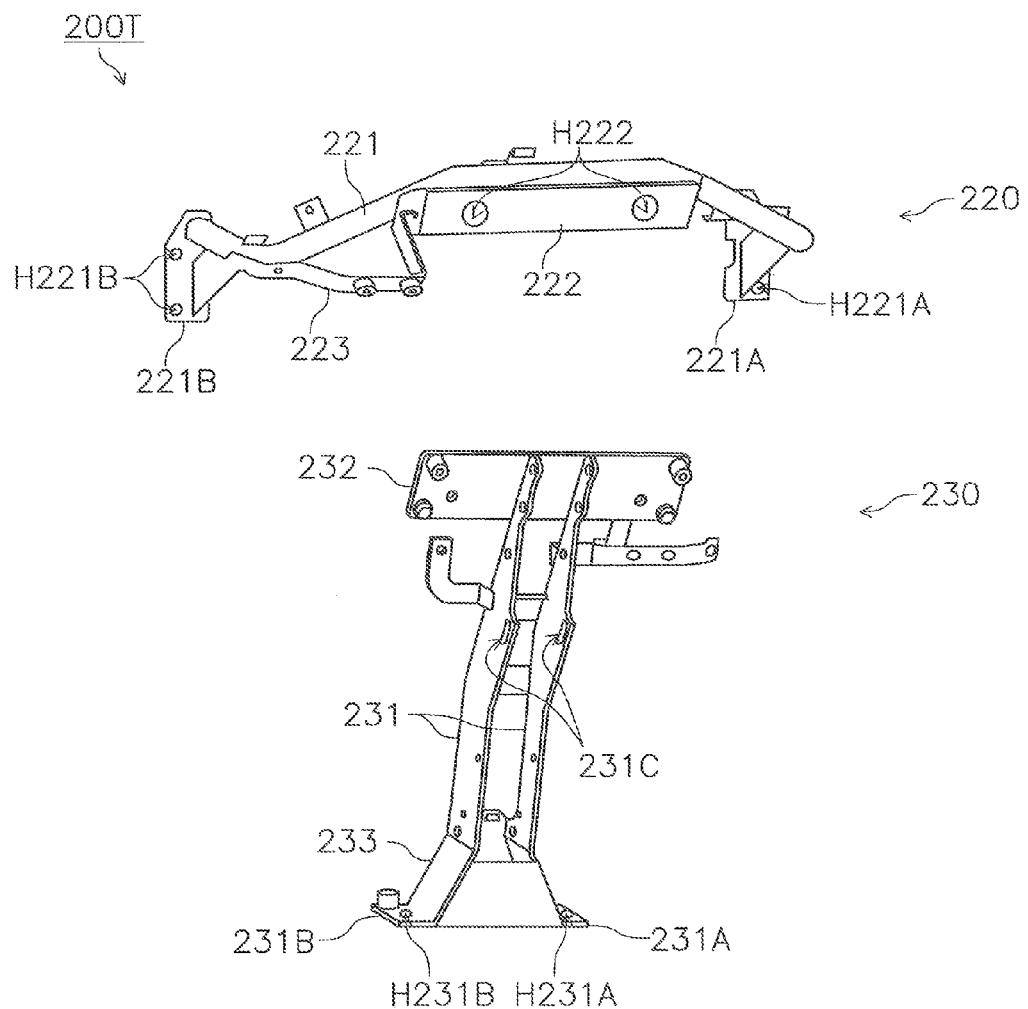
FIG. 6 is an exploded perspective view showing the framework of the front console 200 according to the embodiment.

The configuration of the front console support structure 200T according to the present embodiment will be described with reference to the drawings. FIG. 6 is an exploded perspective view showing the configuration of the front console support structure 200T according to the present embodiment.

The first fixed member 220 has a pipe 221, a coupling part 222, and a binding part 223. The pipe 221 is a tubular member disposed along the inside face of the cover member 210.

The pipe 221 is formed by subjecting a straight pipe to a bending process. A right end 221A (an example of the "first end") having a bolt hole H221A, and a left end 221B (an example of the "second end") having bolt holes H221B are formed in the pipe 221. The right end 221A is connected by a bolt B1 (see FIG. 3) to the right end of the front plate 20, and the left end 221B is connected by bolts B2 (see FIG. 3) to the left end of the front plate 20. In this way, the pipe 221 is disposed across the entire width of the front plate 20, and fixed thereto at two locations directly below the two edges of the front window 30. The first fixed member 220 can be securely fixed to the front plate 20 by this configuration (see FIG. 4).

Both ends of the pipe 221 are bent downward from the center part of the pipe 221. By virtue of this configuration, the pair of downward-projecting parts 30A can be formed on the front window 30, and therefore the operator is afforded a wider field of view to the left and right of the front console 200.

Further, in order to support the front console 200, the pipe 221 has been given a smoothly bent "C" shape in top view, for the purpose of being fixed at the aforementioned locations so as to project out to the opposite front window 30.

The coupling part 222 is connected to the side face of the pipe 221 (to the rear end of the pipe 221 when disposed in the cab 1). The coupling part 222 is coupled to the second fixed member 230. The binding part 223 is connected to the pipe 221 and the coupling part 222. The binding part 223 forms a ring for binding (passage) of the harness 240 between itself and the pipe 221.

The second fastening part 230 has a pair of brackets 231, a coupling plate 232, and a reinforcing plate 233.

Each of the pair of brackets 231 is a bracket formed to a shape resembling a "V." In each of the pair of brackets 231 there are formed a right bottom end 231A having a bolt hole H231A, and a left bottom end 231B having a bolt hole H231B. The right bottom end 231A is connected by a bolt to the floor plate 10, and the left bottom end 231B is connected by a bolt B3 (see FIG. 3) to the floor plate 10, whereby the entire front console 200 is fixed to the floor plate 10. A support part 231C for supporting the steering shaft 51 is formed on each of the pair of brackets 231.

The coupling plate 232 is a plate-shaped member coupled to the coupling part 222 of the first fixed member 220. The reinforcing plate 233 is a reinforcing member coupled to the pair of brackets 231 at their bottom end.

Operation and Effect (1) The front console support structure 200T according to the present embodiment is provided with the first fixed member 220 which supports the cover member 210 and is fixed to the front plate 20, and the second fixed member 230 which supports the first fixed member 220 and is fixed to the floor plate 10.

Because the front console support structure 200T is fixed in this manner not only the floor plate 10, but to the front plate 20 as well, the front console 200 load bearing ability and upright positional stability can be improved. In so doing, the plurality of electronic components (the display monitor 201, the switch bank 202, the A/C panel 205, etc.) and the harness 240 can be disposed in a centralized fashion within the front console 200. Therefore, when a front console 200 of this type is employed as a constituent of a front console unit 100 for covering the entire face of the front plate 20, the front console 200 is fixed at the approximate center of the front plate 20, and the right garnish 300 and the left garnish 400 are then combined with the front console 200. Consequently, the size and/or shape of the front console unit 100 as a whole can be finely adjusted simply through modification of the size and/or shape of the right garnish 300 and the left garnish 400, thereby obviating the need to modify the size and/or shape of the front console 200 for cabs of different size and/or shape.

In the above manner, with the front console support structure 200T according to the present embodiment, all of a plurality of electronic components can be disposed in a centralized fashion in the front console 200, and therefore the versatility of the front console 200 can be improved.

Figure 7:
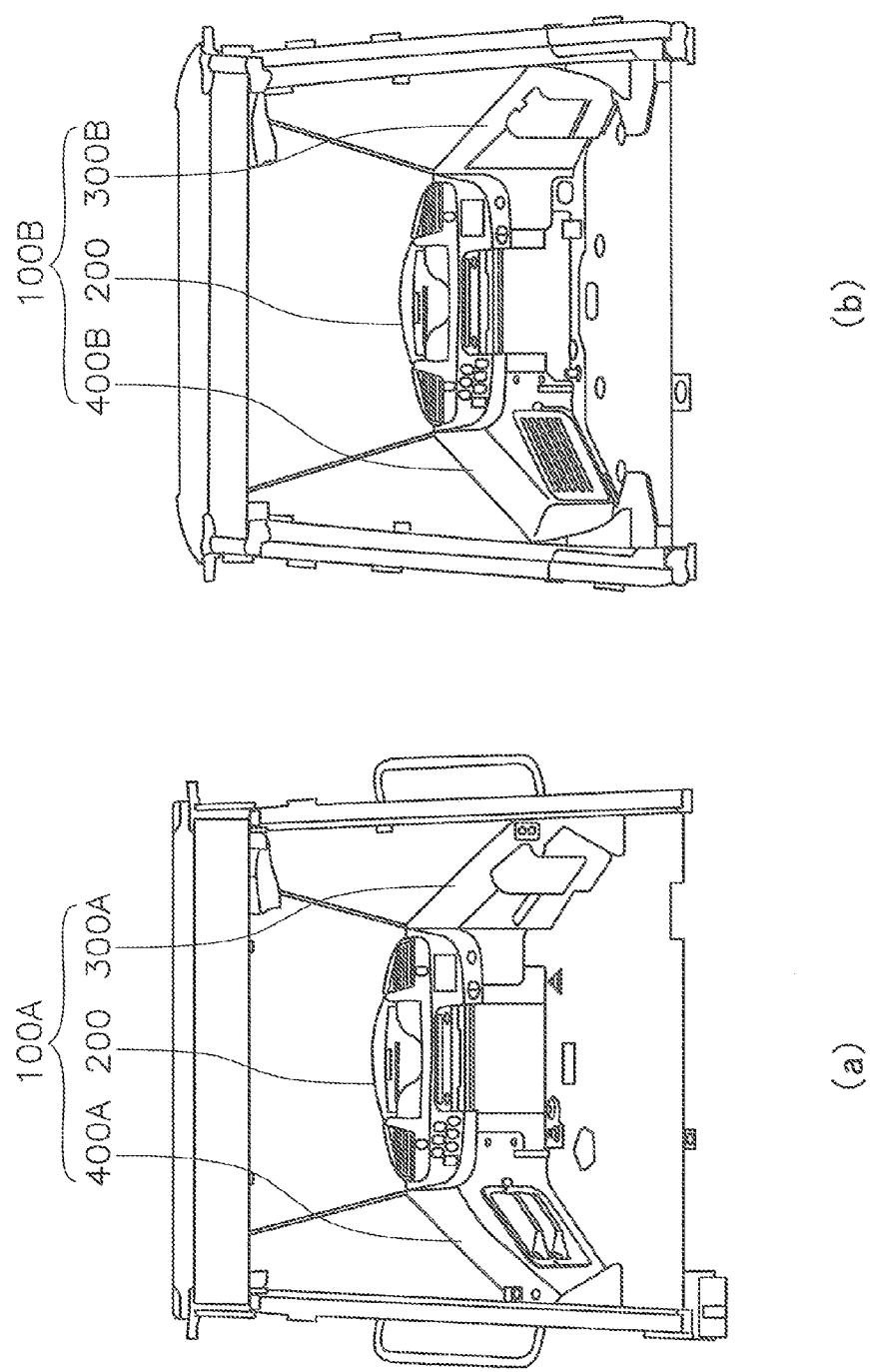
FIG. 7 is a schematic diagram showing an example of modification of the size and shape of a front console unit 100.

FIG. 7 is a schematic diagram showing an example of modification of the size and shape of the front console unit 100. The size of the front console unit 100A shown in FIG. 7(a) is larger than the size of the front console unit 100B shown in FIG. 7(b). However, the units share an identical front console 200, with the size differential between the units being adjusted through a size differential between the right garnish 300A and the right garnish 300B, and a size differential between the left garnish 400A and the left garnish 400B. The garnishes are panels for ornamental purposes, and house no electronic component or harnesses, and therefore design modifications of the garnishes are readily made.

(2) In the front console support structure 200T according to the present embodiment, the harness 240 is wired along the pipe 221 of the first fixed member 220. Because of this, the harness 240 can be readily arranged, whereby the harness 240 can be easily wired. Additionally, because both ends of the pipe 221 (the right end 221A and the left end 221B) are connected to the front plate 20, the front console 200 can be securely fixed.

(3) In the cab 1 for construction machine according to the present embodiment, the front console support structure 200T (more specifically, the second fixed member 230) supports the steering shaft 51. Thus, the steering shaft 51 is supported by the front console support structure 200T which is fixed not only to the floor plate 10, but also to the front plate 20. Because of this, the steering shaft 51 can be supported firmly, whereby vibration of the steering shaft 51 and the steering wheel 52 can be minimized.

(4) Both ends of the pipe 221 are bent downward from the center part of the pipe. Because of this, both ends of the pipe can be disposed at lower positions, and therefore the operator is readily afforded a wide field of view ahead to the left and right. In particular, it is possible to widen the field of view through downward extension of the pair of downward-projecting parts 30A of the front window 30 (see FIG. 3).

Additional Embodiments

While the present invention has been shown in terms of the aforedescribed embodiment, the description and drawings constituting a portion of the disclosure herein should not be construed as limiting the invention. Various alternative embodiments and techniques of working will be apparent to the practitioner of the art, from the disclosure herein.

(A) In the aforedescribed embodiment, the switch bank 202 described as an example of "electronic components" includes eleven switches SW1 to SW11; however, there is no limitation thereto. The switch bank 202 may include other switches necessary for controlling driving of construction machine (for example, an auto-grease button, an engine stop button, or the like). Also, the switch bank 202 may include only necessary switches, from among the eleven switches SW1 to SW11.

(B) In the aforedescribed embodiment, the front console 200 has, by way of example of "electronic components," the display monitor 201 and the A/C panel 205; however, there is no limitation thereto. The front console 200 need not include the display monitor 201 and/or the A/C panel 205, or may include other different electronic components as well (such as a radio, for example).

(C) The front console support structure 200T in the aforedescribed embodiment has the electronic component fastening part 250; however, there is no limitation thereto. The plurality of electronic components (the display monitor 201, the switch bank 202, the harness 240, etc.) may be supported by the cover member 210 and/or the first fixed member 220, etc.

The present invention includes various embodiments not disclosed herein. Consequently, the technical scope of the present invention is to be defined solely by invention-defining matters according to the claims, in appropriate fashion from the preceding description.

The above described embodiments of the present invention afford a cab for a construction machine provided with a support structure for a front console having improved versatility of the front console, and are therefore useful in the field of construction machine.

The invention claimed is:
1. A cab for a construction machine comprising:
a floor plate;

a front plate provided to stand on a front end of the floor plate;

a front window provided to stand on the front plate, the front window extending in a widthwise direction of the cab;

a front console having a cover member, a plurality of electronic components mounted to the cover member, and a harness connected to the plurality of electronic components;

a support structure for the front console having a first fixed member and a second fixed member, the first fixed member supporting the cover member and the harness from within the cover member the second fixed member supporting the first fixed member and being fixed to the floor plate;

a right garnish disposed to the right side of the front console; and a left garnish disposed to the left side of the front console, the first fixed member being disposed inside the cover member between the cover member and the front plate, and having a pipe including a first end and a second end that are connected directly to a rear face of the front plate at two locations directly below both widthwise ends of the front window, the second fixed member extending upward to support a center part of the pipe from below the pipe.

2. The cab for a construction machine according to claim 1, further comprising:

a steering unit having a steering wheel, and a steering shaft supporting the steering wheel, wherein the support structure for the front console supports the steering shaft.

3. The cab for a construction machine according to claim 1, wherein a height of the right garnish decreases as a distance from the front console increases.

4. The cab for a construction machine according to claim 1, wherein a height of the left garnish decreases as a distance from the front console increases.

5. The cab for a construction machine according to claim 1, wherein both of the first and second ends of the pipe are bent downward from the center part of the pipe.

6. The cab for a construction machine according to claim 5, wherein the first and second ends of the pipe extend frontward and are connected to the front plate at positions lower than the center part of the pipe.

7. The cab for a construction machine according to claim 5, wherein the pipe has a smoothly bent C shape in a top view.

8. The cab for a construction machine according to claim 1, wherein the harness is supported by the pipe.

9. The cab for a construction machine according to claim 8, wherein the harness is wired along the pipe.

10. The cab for a construction machine according to claim 1, wherein the pipe is configured and arranged to curve along an inside face of the cover member.

11. The cab for a construction machine according to claim 1, wherein the right garnish and the left garnish are electrically isolated from the front console.

12. The cab for a construction machine according to claim 11, wherein neither the right garnish nor the left garnish houses an electronic component.

13. The cab for a construction machine according to claim 1, wherein the right garnish and the left garnish are fixed to the front plate but not connected directly to the front console.

* * * * *